United States Patent
Agiral et al.

(10) Patent No.: US 12,122,954 B2
(45) Date of Patent: Oct. 22, 2024

(54) ORGANIC HEAT TRANSFER SYSTEM, METHOD AND FLUID

(71) Applicant: The Lubrizol Corporation, Wickliffe, OH (US)

(72) Inventors: Anil Agiral, Pepper Pike, OH (US); Melinda E. Bartlett, Willowick, OH (US); Douglas T. Jayne, Novelty, OH (US); Eugene Pashkovski, Moreland Hills, OH (US); Amy L. Short, Lakewood, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 18/021,040

(22) PCT Filed: Aug. 19, 2021

(86) PCT No.: PCT/US2021/046592
§ 371 (c)(1),
(2) Date: Feb. 13, 2023

(87) PCT Pub. No.: WO2022/040372
PCT Pub. Date: Feb. 24, 2022

(65) Prior Publication Data
US 2023/0416583 A1    Dec. 28, 2023

Related U.S. Application Data

(60) Provisional application No. 63/068,199, filed on Aug. 20, 2020.

(51) Int. Cl.
| | |
|---|---|
| *C09K 5/10* | (2006.01) |
| *C09K 23/00* | (2022.01) |
| *C09K 23/16* | (2022.01) |
| C08K 3/14 | (2006.01) |
| C08K 3/22 | (2006.01) |
| C08K 5/16 | (2006.01) |
| C08K 7/18 | (2006.01) |
| C08K 13/02 | (2006.01) |
| C09K 3/18 | (2006.01) |

(52) U.S. Cl.
CPC .............. *C09K 5/10* (2013.01); *C09K 23/002* (2022.01); *C09K 23/16* (2022.01); C08K 3/14 (2013.01); C08K 3/22 (2013.01); C08K 5/16 (2013.01); C08K 7/18 (2013.01); C08K 13/02 (2013.01); C09K 3/18 (2013.01)

(58) Field of Classification Search
CPC ... C09K 5/10; C09K 5/00; C09K 5/20; C09K 23/002; C09K 23/16; C09K 3/18; C08K 3/14; C08K 3/22; C08K 2003/222; C08K 2003/2227; C08K 2003/385; C08K 2003/282; C08K 5/16; C08K 7/18; C08K 13/02; C08K 13/04; C08K 13/08; C08K 2201/001; C08K 2201/005; C08K 2201/011
See application file for complete search history.

(56) References Cited

U.S. PATENT DOCUMENTS

| | | | |
|---|---|---|---|
| 6,277,298 B1 * | 8/2001 | Borduz | H01F 1/44 252/62.52 |
| 7,923,474 B2 * | 4/2011 | Carlblom | C09K 23/002 523/205 |
| 8,075,799 B2 | 12/2011 | Hong et al. | |
| 9,051,502 B2 * | 6/2015 | Sedarous | C09K 5/10 |
| 10,712,105 B1 | 7/2020 | Christensen et al. | |
| 2009/0247652 A1 * | 10/2009 | Silverman | B01J 13/0047 516/33 |
| 2010/0006798 A1 * | 1/2010 | Endo | C09K 5/14 252/78.3 |
| 2013/0200299 A1 | 8/2013 | Mazyar et al. | |
| 2013/0285781 A1 * | 10/2013 | Yin | H01F 27/12 977/773 |
| 2015/0048272 A1 * | 2/2015 | Rai | B02C 23/06 252/75 |
| 2017/0056851 A1 | 3/2017 | Nagano et al. | |
| 2018/0265713 A1 * | 9/2018 | Norn | C09D 167/08 |

FOREIGN PATENT DOCUMENTS

WO    2020023642    1/2020

* cited by examiner

*Primary Examiner* — Jane L Stanley
(74) *Attorney, Agent, or Firm* — Christopher P. Demas; Michael A. Miller

(57) ABSTRACT

The disclosed technology relates to a heat transfer system and heat transfer method employing stable colloidal dispersion of a) a non-conductive, non-aqueous and non-water miscible dielectric oleaginous heat transfer fluid, b) at least one solid nanoparticle, and c) a surfactant. In particular, the technology relates to a stable colloidal dispersion with low electrical conductivity, low flammability, and low freeze point that provides excellent peak temperature reduction in a heat transfer system, such as that for cooling a battery pack or a power system of an electric vehicle.

8 Claims, No Drawings

ORGANIC HEAT TRANSFER SYSTEM, METHOD AND FLUID

CROSS REFERENCE TO RELATED APPLICATION

This application claims priority from PCT Application Serial No. US21/046592 filed on Aug. 19, 2021, which claims the benefit of U.S. Provisional Application No. 63/068,199 filed on Aug. 20, 2020, the entirety of which is hereby incorporated by reference.

BACKGROUND OF THE INVENTION

The disclosed technology relates to a heat transfer system and heat transfer method employing a stable colloidal dispersion of a) a nonconductive, non-aqueous and non-water miscible dielectric oleaginous heat transfer fluid, b) at least one solid nanoparticle, and c) a surfactant. In particular, the technology relates to a stable colloidal dispersion with low electrical conductivity, low flammability, and low freeze point that provides excellent peak temperature reduction in a heat transfer system, such as that for cooling a battery pack or a power system of an electric vehicle.

The operation of a power source generates heat. A heat transfer system, in communication with the power source, regulates the generated heat, and ensures that the power source operates at an optimum temperature. The heat transfer system generally comprises a heat transfer fluid that facilitates absorbing and dissipating the heat from the power source. Heat transfer fluids, which generally consist of water and a glycol, can be expensive and are prone to freezing. Traditional heat transfer fluids can also exhibit extremely high conductivities, often in the range of 3000 microsiemens per centimeter (µS/cm) or more. This high conductivity produces adverse effects on the heat transfer system by promoting corrosion of metal parts, and also in the case of power sources where the heat transfer system is exposed to an electrical current, such as in fuels cells or the like, the high conductivity can lead to short circuiting of the electrical current and to electrical shock.

Although battery packs are designed to provide high levels of safety and stability, situations can arise where a portion of a battery pack experiences a local thermal condition which generates significant heat. When the temperature is great enough and sustained, the local thermal condition can transform into a runaway thermal condition affecting wide areas of the battery pack, and sometimes the entire battery pack under certain circumstances.

Current battery pack designs include an integrated and isolated cooling system that routes coolant throughout the enclosure. When in good working order, the coolant from the cooling system does not come into contact with the electric potentials protected within. It does happen that sometimes a leak occurs and coolant enters into unintended parts of the enclosure. If the coolant is electrically conductive, it can bridge terminals having relatively large potential differences. That bridging may start an electrolysis process in which the coolant is electrolyzed and the coolant will begin to boil when enough energy is conducted into the electrolysis. This boiling can create the local thermal condition that can lead to the runaway thermal condition described above.

A need exists for a heat transfer system and method employing an inexpensive heat transfer fluid with a low electrical conductivity and freeze point.

SUMMARY OF THE INVENTION

The disclosed technology, therefore, solves the problem of safety concerns in the cooling of electrical componentry by providing a stable colloidal dispersion for cooling the electrical componentry, along with a method of operating the electrical componentry in contact with the stable colloidal dispersion.

DETAILED DESCRIPTION OF THE INVENTION

Various preferred features and embodiments will be described below by way of non-limiting illustration.

The disclosed technology provides, among other things, a stable colloidal dispersion. The stable colloidal dispersion includes a) a nonconductive, non-aqueous and non-water miscible fluid, b) a solid nanoparticle, and c) a surfactant. As used herein, the term "a," as in "a" solid nanoparticle, or "a" surfactant, or "a" fluid, is not limited to just one of the stated elements, but is used to mean "at least one," which includes one or more of the stated elements, as well as two or more, three or more and so on.

Non-Conductive, Non-Aqueous, Non-Water Miscible Fluid

One component of the disclosed technology is a non-conductive, non-aqueous and non-water miscible fluid (or "NCAMF" for short). The NCAMF can be may be selected from any of the base oils in Groups IV of the American Petroleum Institute (API) Base Oil Interchangeability Guidelines (2011), namely

| Base Oil Category | Sulfur (%) | Saturates (%) | Viscosity Index |
|---|---|---|---|
| Group I | >0.03 and/or | <90 | 80 to less than 120 |
| Group II | ≤0.03 and | ≥90 | 80 to less than 120 |
| Group III | ≤0.03 and | ≥90 | ≥120 |
| Group IV | | All polyalphaolefins (PAOs) | |
| Group V | | All others not included in Groups I, II, III or IV | |

Groups I, II and III are mineral oil base stocks. Other generally recognized categories of base oils may be used, even if not officially identified by the API: Group II+, referring to materials of Group II having a viscosity index of 110-119 and lower volatility than other Group II oils; and Group III+, referring to materials of Group III having a viscosity index greater than or equal to 130.

While many NCAMF may work in the method and/or system, it has been found that certain isoparaffins provide particularly improved heat transfer.

Isoparaffins (or isoparaffinic oils) are saturated hydrocarbon compounds containing at least one hydrocarbyl branch, sufficient to provide fluidity to both very low and high temperatures. Isoparaffins of the invention may include natural and synthetic oils, oil derived from hydrocracking, hydrogenation, and hydrofinishing of refined oils, re-refined oils or mixtures thereof.

Synthetic NCAMFs may be produced by isomerization of predominantly linear hydrocarbons to produce branched hydrocarbons. Linear hydrocarbons may be naturally sourced, synthetically prepared, or derived from Fischer-Tropsch reactions or similar processes. Isoparaffins may be derived from hydro-isomerized wax and typically may be hydroisomerised Fischer-Tropsch hydrocarbons or waxes.

In one embodiment oils may be prepared by a Fischer-Tropsch gas-to-liquid synthetic procedure as well as other gas-to-liquid oils.

Suitable isoparaffins may also be obtained from natural, renewable, sources. Natural (or bio-derived) oils refer to materials derived from a renewable biological resource, organism, or entity, distinct from materials derived from petroleum or equivalent raw materials. Natural sources of hydrocarbon oil include fatty acid triglycerides, hydrolyzed or partially hydrolyzed triglycerides, or transesterified triglyceride esters, such as fatty acid methyl ester (or FAME). Suitable triglycerides include, but are not limited to, palm oil, soybean oil, sunflower oil, rapeseed oil, olive oil, linseed oil, and related materials. Other sources of triglycerides include, but are not limited to algae, animal tallow, and zooplankton. Linear and branched hydrocarbons may be rendered or extracted from vegetable oils and hydro-refined and/or hydro-isomerized in a manner similar to synthetic oils to produce isoparaffins.

Another class of isoparaffinic oils includes polyolefins. Polyolefins are well known in the art. In one embodiment, the polyolefin may be derivable (or derived) from olefins with 2 to 24 carbon atoms. By derivable or derived it is meant the polyolefin is polymerized from the starting polymerizable olefin monomers having the noted number of carbon atoms or mixtures thereof. In embodiments, the polyolefin may be derivable (or derived) from olefins with 3 to 24 carbon atoms. In some embodiments, the polyolefin may be derivable (or derived) from olefins with 4 to 24 carbon atoms. In further embodiments, the polyolefin may be derivable (or derived) from olefins with 5 to 20 carbon atoms. In still further embodiments, the polyolefin may be derivable (or derived) from olefins with 6 to 18 carbon atoms. In still further embodiments, the polyolefin may be derivable (or derived) from olefins with 8 to 14 carbon atoms. In alternate embodiments, the polyolefin may be derivable (or derived) from olefins with 8 to 12 carbon atoms.

Often the polymerizable olefin monomers comprise one or more of propylene, isobutene, 1-butene, isoprene, 1,3-butadiene, or mixtures thereof. An example of a useful polyolefin is polyisobutylene.

Polyolefins also include poly-α-olefins derivable (or derived) from α-olefins. The α-olefins may be linear or branched or mixtures thereof. Examples include monoolefins such as propylene, 1-butene, isobutene, 1-pentene, 1-hexene, 1-heptene, 1-octene, 1-nonene, 1-decene, etc. Other examples of α-olefins include 1-decene, 1-undecene, 1-dodecene, 1-tridecene, 1-tetradecene, 1-pentadecene, 1-hexadecene, 1-heptadecene 1-octadecene, and mixtures thereof. An example of a useful α-olefin is 1-dodecene. An example of a useful poly-α-olefin is poly-decene.

The polyolefin may also be a copolymer of at least two different olefins, also known as an olefin copolymer (OCP). These copolymers are preferably copolymers of α-olefins having from 2 to about 28 carbon atoms, preferably copolymers of ethylene and at least one α-olefin having from 3 to about 28 carbon atoms, typically of the formula $CH_2=CHR_1$ wherein $R_1$ is a straight chain or branched chain alkyl radical comprising 1 to 26 carbon atoms. Preferably $R_1$ in the above formula can be an alkyl of from 1 to 8 carbon atoms, and more preferably can be an alkyl of from 1 to 2 carbon atoms. Preferably, the polymer of olefins is an ethylenepropylene copolymer.

Where the olefin copolymer includes ethylene, the ethylene content is preferably in the range of 20 to 80 percent by weight, and more preferably 30 to 70 percent by weight.

When propylene and/or 1-butene are employed as comonomer(s) with ethylene, the ethylene content of such copolymers is most preferably 45 to 65 percent, although higher or lower ethylene contents may be present.

The NCAMF may be substantially free of ethylene and polymers thereof. The composition may be completely free of ethylene and polymers thereof. By substantially free, it is meant that the composition contains less than 50 ppm, or less than 30 ppm, or even less than 10 ppm or 5 ppm, or even less than 1 ppm of the given material.

The NCAMF may be substantially free of propylene and polymers thereof. The NCAMF may be completely free of propylene and polymers thereof. The polyolefin polymers prepared from the aforementioned olefin monomers can have a number average molecular weight of from 140 to 5000. The polyolefin polymers prepared from the aforementioned olefin monomers can also have a number average molecular weight of from 200 to 4750. The polyolefin polymers prepared from the aforementioned olefin monomers can also have a number average molecular weight of from 250 to 4500. The polyolefin polymers prepared from the aforementioned olefin monomers can also have a number average molecular weight of from 500 to 4500. The polyolefin polymers prepared from the aforementioned olefin monomers can also have a number average molecular weight of from 750 to 4000 as measured by gel permeation chromatography (GPC) with polystyrene standard. GPC with a polystyrene standard is the standard method employed for all Mn quoted in this reference.

Mixtures of mineral oil and synthetic oils, e.g., polyalphaolefin oils and/or polyester oils, may be used.

The NCAMF can be a saturated hydrocarbon compound containing 8 carbon atoms up to a maximum of 50 carbon atoms and having at least one hydrocarbyl branch containing at least one carbon atom. In one embodiment, the saturated hydrocarbon compound can have at least 10 or at least 12 carbon atoms. In one embodiment, the saturated hydrocarbon compound can contain 14 to 34 carbon atoms with the proviso that the longest continuous chain of carbon atoms is no more than 24 carbons in length.

In embodiments, the NCAMF will have a longest continuous chain of carbon atoms of no more than 24 carbons in length.

In embodiments, the saturated hydrocarbon compound can be a branched acyclic compound with a molecular weight of 140 g/mol to 550 g/mol as measured by size exclusion chromatography (SEC also called gel permeation chromatography or GPC), liquid chromatography, gas chromatography, mass spectrometry, NMR, or combinations thereof, or from 160 g/mol to 480 g/mol.

Mineral oils often contain cyclic structures, i.e. aromatics or cycloparaffins also called naphthenes. In one embodiment, the isoparaffin comprises a saturated hydrocarbon compound free of or substantially free of cyclic structures. By substantially free, it is meant there is less than 1 mol % of cyclic structures in the mineral oil, or less than 0.75 mol %, or less than 0.5 mol %, or even less than 0.25 mol %. In some embodiments, the mineral oil is completely free of cyclic structures.

It has also been found that certain ester oils and ether oils as well provide particularly improved heat transfer when used as the dielectric oleaginous heat transfer fluids in the disclosed method.

Esters suitable for use as dielectric oleaginous heat transfer fluids include esters of monocarboxylic acids with monohydric alcohols; di-esters of diols with monocarboxylic acids and di-esters of dicarboxylic acids with monohydric alcohols; polyol esters of monocarboxylic acids and polyesters of monohydric alcohols with polycarboxylic acids; and mixtures thereof. Esters may be broadly grouped into two categories: synthetic and natural.

Synthetic esters suitable as the dielectric oleaginous heat transfer fluids may comprise esters of monocarboxylic acid (such as neopentanoic acid, 2-ethylhexanoic acid) and dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, and alkenyl malonic acids) with any of variety of monohydric alcohols (e.g., butyl alcohol, pentyl alcohol, neopentyl alcohol, hexyl alcohol, octyl alcohol, iso-octyl alcohol, nonyl alcohol, decyl alcohol, isodecyl alcohol, dodecyl alcohol, tetradecyl alcohol, hexadecyl alcohol, 2-ethylhexyl alcohol, ethylene glycol, diethylene glycol monoether, and propylene glycol). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid. Other synthetic esters include those made from $C_5$ to $C_{12}$ monocarboxylic acids and polyols and polyol ethers such as neopentyl glycol, trimethylolpropane, pentaerythritol, dipentaerythritol, and tripentaerythritol. Esters can also be monoesters of mono-carboxylic acids and monohydric alcohols.

Natural (or bio-derived) esters refer to materials derived from a renewable biological resource, organism, or entity, distinct from materials derived from petroleum or equivalent raw materials. Natural esters suitable as the dielectric oleaginous heat transfer fluids include fatty acid triglycerides, hydrolyzed or partially hydrolyzed triglycerides, or transesterified triglyceride esters, such as fatty acid methyl ester (or FAME). Suitable triglycerides include, but are not limited to, palm oil, soybean oil, sunflower oil, rapeseed oil, olive oil, linseed oil, and related materials. Other sources of triglycerides include, but are not limited to, algae, animal tallow, and zooplankton.

Other suitable oleaginous fluids include alkylated aromatic oils (such as alkylated naphthalene), low viscosity naphthenic mineral oils, and (poly)ether oils. Alkylene oxide polymers and interpolymers and derivatives thereof, and those where terminal hydroxyl groups have been modified by, for example, esterification or etherification, constitute other classes of known synthetic lubricating oils that can be used. Examples of (poly)ether base oils include diethylene glycol dibutyl ether.

Solid Nanoparticle

The stable colloidal dispersion includes at least one solid nanoparticle or mixture of solid nanoparticles.

The solid nanoparticles can include both metal nanoparticles and non-metal nanoparticles.

For metal nanoparticles, the metal of the solid metal nanoparticles can include an alkaline earth metal, for example, magnesium, calcium, strontium, and barium.

The metal of the solid metal nanoparticles can include a transition metal, for example, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, and cadmium.

The metal of the solid metal nanoparticles can include a lanthanide series or actinide series metal, for example, lanthanum, cerium, praseodymium, neodymium, promethium, samarium, europium, gadolinium, terbium, dysprosium, holmium, erbium, thulium, ytterbium, lutetium, thorium, protactinium, and uranium).

The metal of the solid metal nanoparticles can include a post-transition metal, for example, aluminum, gallium, indium, thallium, tin, lead, bismuth, and polonium.

The metal of the solid metal nanoparticles can include a metalloid, for example, boron, silicon, germanium, and antimony.

In certain embodiments, the metal can include aluminum. In embodiments, the metal can include iron. The metal can also include ruthenium. The metal can include cobalt. The metal can include rhodium. The metal can include nickel. The metal can include palladium. The metal can include platinum. The metal can include silver. The metal can include gold. The metal can include cerium. The metal can include samarium. The metal can include tungsten.

The solid metal nanoparticles can be present in their pure form, or, as an oxide, carbide, nitride or mixture of any of these materials or combination of materials.

For example, the solid metal nanoparticles can be iron oxide (e.g., $Fe_2O_3$, $Fe_3O_4$), cobalt oxide (e.g., CoO), zinc oxide (e.g., ZnO), cerium oxide (e.g., $CeO_2$), and titanium oxide (e.g., $TiO_2$). Boron Oxide (e.g., $B_2O_3$) is another solid metal nanoparticle that may be employed. Aluminum Oxide (e.g., $Al_2O_3$) is another solid metal nanoparticle that may be employed. Magnesium oxide (e.g., MgO) is another solid metal nanoparticle that may be employed. Tungsten oxide (e.g., $W_2O_3$, $WO_2$, $WO_3$, $W_2O_5$) is another solid metal nanoparticle that may be employed.

Examples of metal carbide solid metal nanoparticles can include iron carbide (e.g., $Fe_3CH_4$), cobalt carbide (e.g., CoC, $CO_2C$, CoaC), zinc carbide (e.g., ZnC), cerium carbide (e.g., $CeC_2$), and titanium carbide (e.g., TiC). Boron carbide (e.g., $B_4C$) is another solid metal nanoparticle that may be employed. Aluminum carbide (e.g., $Al_4C_3$) is another solid metal nanoparticle that may be employed. Tungsten carbide (e.g., WC) is another solid metal nanoparticle that may be employed.

Examples of metal nitride solid metal nanoparticles can include iron nitride (e.g., $Fe_2N$, $Fe_3N_4$, $Fe_4N$, $Fe_7N_3$, $Fe_{16}N_2$), cobalt nitride (e.g., $Co_2N$, $Co_3N$, $Co_4N$), zinc nitride (e.g., $Zn_3N_2$), cerium nitride (e.g., CeN), and titanium nitride (e.g., TiN). Boron nitride (e.g., BN) is another solid metal nanoparticle that may be employed. Aluminum nitride (e.g., AlN) is another solid metal nanoparticle that may be employed. Tungsten nitride (e.g., WN, $W_2N$, $WN_2$) is another solid metal nanoparticle that may be employed.

The solid nanoparticles can also include solid non-metal nanoparticles. Such solid non-metal nanoparticles can be present in the form of oxides, carbides, nitrides or mixture of any of these materials or combination of materials. For example, the solid non-metal nanoparticles can be graphene oxide.

The solid nanoparticle can have a D50 particle size of less than 1000 nm. In some embodiments, the solid nanoparticles can have a D50 particle size of less than 700 nm. The solid nanoparticle can have a D50 particle size of less than 500 nm. The solid nanoparticle can have a D50 particle size of less than 250 nm. The solid nanoparticle can have a D50 particle size of less than 100 nm. The solid nanoparticle can have a D50 particle size of less than 75 nm. The solid nanoparticle can have a D50 particle size of less than 50 nm. The solid nanoparticle can have a D50 particle size of 0.01 nm to 1000 nm. The solid nanoparticle can also have a D50 particle size of 0.1 nm to 100 nm. The solid nanoparticle can have a D50 particle size of 1 nm to 75 nm. The solid nanoparticle can have a D50 particle size of 10 nm to 50 nm. D50 particle sizes can be measured by Dynamic Light Scattering according to ASTM E2490-09(2015).

The solid nanoparticle can have an average aspect ratio of from 1 to 5000. As used herein, the "average aspect ratio" refers to the average ratio of the length of the particles in a nanoparticle mixture to the width of the particles in the mixture. The term "average" is intended to mean that any and all aspect ratios may be present, but that the average aspect ratio over the aggregate is in the disclosed range. The measurement method for determining the length and width for the average aspect ratio are not critical so long as the same measurement method is used for both the measurements. The solid nanoparticle can also have an average aspect ratio of from 1 to 2500. The solid nanoparticle can also have an average aspect ratio of from 1 to 1000. The solid nanoparticle can also have an average aspect ratio of from 1 to 500. The solid nanoparticle can also have an average aspect ratio of from 1 to 250. The solid nanoparticle can also have an average aspect ratio of from 1 to 100. The solid nanoparticle can also have an average aspect ratio of from 1 to 50. The solid nanoparticle can also have an average aspect ratio of from 1 to 25. The solid nanoparticle can also have an average aspect ratio of from 1 to 10. The solid nanoparticle can also have an average aspect ratio of from 10 to 5000. The solid nanoparticle can also have an average aspect ratio of from 25 to 5000. The solid nanoparticle can also have an average aspect ratio of from 50 to 5000. The solid nanoparticle can also have an average aspect ratio of from 100 to 5000. The solid nanoparticle can also have an average aspect ratio of from 250 to 5000. The solid nanoparticle can also have an average aspect ratio of from 500 to 5000. The solid nanoparticle can also have an average aspect ratio of from 1000 to 5000. The solid nanoparticle can also have an average aspect ratio of from 2500 to 5000.

In general, the solid nanoparticle will be selected to have a thermal conductivity greater than the thermal conductivity of the aforementioned NCAMF. In some embodiments, the stable colloidal dispersion can include a solid nanoparticle having a minimum thermal conductivity of greater than 5 W/m-K. In some embodiments, the stable colloidal dispersion can include a solid nanoparticle having a thermal conductivity of 10 W/m-K or greater. In some embodiments, the stable colloidal dispersion can include a solid nanoparticle having a thermal conductivity of 30 W/m-K or greater. In some embodiments, the stable colloidal dispersion can include a solid nanoparticle having a thermal conductivity of 250 W/m-K or greater. In some embodiments, the stable colloidal dispersion can include a solid nanoparticle having a thermal conductivity of 500 W/m-K or greater. In some embodiments, the stable colloidal dispersion can include a solid nanoparticle having a thermal conductivity of 1000 W/m-K or greater. As used herein, thermal conductivity can be measured by ASTM D7896-19.

The stable colloidal dispersion can include the at least one solid nanoparticle at a concentration of from 0.5 to 40 wt % based on the weight of the colloidal dispersion. In some embodiments, the stable colloidal dispersion can include the at least one solid nanoparticle at a concentration of from 0.75 to 35 wt %. In some embodiments, the stable colloidal dispersion can include the at least one solid nanoparticle at a concentration of from 1 to 30 wt %. In embodiments, the stable colloidal dispersion can include the at least one solid nanoparticle at a concentration of from 1.25 to 25 wt %. In some embodiments, the stable colloidal dispersion can include the at least one solid nanoparticle at a concentration of from 0.5 to 10 wt %. In some embodiments, the stable colloidal dispersion can include the at least one solid nanoparticle at a concentration of from 0.75 to 8 wt %. In some embodiments, the stable colloidal dispersion can include the at least one solid nanoparticle at a concentration of from 0.1 to 6 wt %. In some embodiments, the stable colloidal dispersion can include the at least one solid nanoparticle at a concentration of from 10 to 40 wt %. In some embodiments, the stable colloidal dispersion can include the at least one solid nanoparticle at a concentration of from 15 to 35 wt %. In some embodiments, the stable colloidal dispersion can include the at least one solid nanoparticle at a concentration of from 20 to 30 wt %.

However, when dosing the solid nanoparticle, care should be taken not to exceed the dielectric constant constraints for the stable colloidal dispersion. Generally, this will not be an issue except where more conductive solid nanoparticles are employed, such as solid nanoparticles in the form of pure metals, and generally at high levels, such as 10 wt % or more. Where there is concern, the stable colloidal dispersion can be formulated and the dielectric constant of the dispersion tested.

Surfactant

The stable colloidal dispersion includes at least one surfactant. Surfactants are well known in the art. Those of ordinary skill in the art will instantly recognize that a surfactant includes both an oleophilic portion, which confers solubility of the surfactant in an oleaginous fluid, and a polar portion, which allows the surfactant to cleave to particles.

The surfactants of the present technology will indeed include both a hydrocarbyl backbone that imparts solubility in the non-conductive, non-aqueous and non-water miscible fluid, and a polar portion that can associate with the at least one solid nanoparticle and keep the particles dispersed in the fluid.

The surfactants can include, for example, anionic surfactants, cationic surfactants, nonionic surfactants, amphoteric surfactants, and dispersants.

In an embodiment, the surfactant can be an anionic surfactant. Non-limiting examples of anionic surfactants are disclosed in McCutcheon's Detergents and Emulsifiers, North American Edition, 1998, published by Allured Publishing Corporation; and McCutcheon's, Functional Materials, North American Edition (1992); both of which are incorporated by reference herein in their entirety. The anionic surfactant can be any of the anionic surfactants known or previously used in the art of aqueous surfactant compositions. Suitable anionic surfactants include but are not limited to salicylates, alkyl sulfates, alkyl ether sulfates, alkyl sulphonates, alkaryl sulfonates, α-olefin-sulphonates, alkylamide sulphonates, alkarylpolyether sulphates, alkylamidoether sulphates, alkyl monoglyceryl ether sulfates, alkyl monoglyceride sulfates, alkyl monoglyceride sulfonates, alkyl succinates, alkyl sulfosuccinates, alkyl sulfosuccinamates, alkyl ether sulphosuccinates, alkyl amidosulfosuccinates; alkyl sulphoacetates, alkyl phosphates, alkyl ether phosphates, alkyl ether carboxylates, alkyl amidoethercarboxylates, N-alkylamino acids, N-acyl amino acids, alkyl peptides, N-acyl taurates, alkyl isethionates, carboxylate salts wherein the acyl group is derived from fatty acids; and the alkali metal, alkaline earth metal, ammonium, amine, and triethanolamine salts thereof.

In one aspect, the cation moiety of the aforementioned salts is selected from sodium, potassium, calcium, magnesium, ammonium, mono-, di- and triethanolamine salts, and mono-, di-, and tri-isopropylamine salts. The alkyl and acyl groups of the aforementioned anionic surfactants can contain from 6 to about 24 carbon atoms. The alkyl and acyl groups of the aforementioned anionic surfactants can contain from 8 to 22 carbon atoms. In some embodiments, the alkyl and acyl groups of the aforementioned anionic surfactants can contain from 12 to 18 carbon atoms. The alkyl and acyl groups can be saturated or unsaturated. The aryl groups in the surfactants can be selected from phenyl or benzyl. The ether containing surfactants set forth above can contain from 1 to 10 ethylene oxide and/or propylene oxide units per surfactant molecule in one aspect, and from 1 to 3 ethylene oxide units per surfactant molecule in another aspect.

Further examples of suitable anionic surfactants include but are not limited to the sodium, potassium, lithium, calcium, magnesium, and ammonium salts of laureth sulfate, trideceth sulfate, myreth sulfate, C12-C13 pareth sulfate, C12-C14 pareth sulfate, and C12-C15 pareth sulfate, ethoxylated with 1, 2, 3, 4 or 5 moles of ethylene oxide; sodium, potassium, lithium, magnesium, ammonium, and triethanolamine lauryl sulfate, coco sulfate, tridecyl sulfate, myrstyl sulfate, cetyl sulfate, cetearyl sulfate, stearyl sulfate, oleyl sulfate, and tallow sulfate, disodium lauryl sulfosuccinate, disodium laureth sulfosuccinate, sodium cocoyl isethionate, sodium C12-C14 olefin sulfonate, sodium laureth-6 carboxylate, sodium methyl cocoyl taurate, sodium cocoyl glycinate, sodium myristyl sarcocinate, sodium dodecylbenzene sulfonate, calcium and/or magnesium alkylbenzene sulfonate, sodium cocoyl sarcosinate, sodium cocoyl glutamate, potassium myristoyl glutamate, triethanolamine monolauryl phosphate, and fatty acid soaps, including the sodium, potassium, ammonium, and triethanolamine salts of a saturated and unsaturated fatty acids containing from about 8 to about 22 carbon atoms.

The cationic surfactants can be any of the cationic surfactants known or previously used in the art of aqueous surfactant compositions. Useful cationic surfactants can be one or more of those described, for example, in McCutcheon's Detergents and Emulsifiers, North American Edition, 1998, supra, and Kirk-Othmer, Encyclopedia of Chemical Technology, 4th Ed., Vol. 23, pp. 478-541, the contents of which are herein incorporated by reference, to the extent such surfactants are soluble in the NCAMF. Suitable classes of cationic surfactants include but are not limited to alkyl amines, alkyl imidazolines, ethoxylated amines, quaternary compounds, and quaternized esters. In addition, alkyl amine oxides can function as a cationic surfactant at a low pH.

Alkylamine surfactants can be salts of primary, secondary and tertiary fatty $C_{12}$-$C_{22}$ alkylamines, substituted or unsubstituted, and substances sometimes referred to as "amidoamines". Non-limiting examples of alkylamines and salts thereof include dimethyl cocamine, dimethyl palmitamine, dioctylamine, dimethyl stearamine, dimethyl soyamine, soyamine, myristyl amine, tridecyl amine, ethyl stearylamine, N-tallowpropane diamine, ethoxylated stearylamine, dihydroxy ethyl stearylamine, arachidylbehenylamine, dimethyl lauramine, stearylamine hydrochloride, soyamine chloride, stearylamine formate, N-tallowpropane diamine dichloride, and amodimethicone.

Non-limiting examples of amidoamines and salts thereof include stearamido propyl dimethyl amine, stearamidopropyl dimethylamine citrate, palmitamidopropyl diethylamine, and cocamidopropyl dimethylamine lactate.

Non-limiting examples of alkyl imidazoline surfactants include alkyl hydroxyethyl imidazoline, such as stearyl hydroxyethyl imidazoline, coco hydroxyethyl imidazoline, ethyl hydroxymethyl oleyl oxazoline, and the like.

Non-limiting examples of ethyoxylated amines include PEG-cocopolyamine, PEG-15 tallow amine, quaternium-52, and the like.

Among the quaternary ammonium compounds useful as cationic surfactants, some correspond to the general formula: $(R^{20}R^{21}R^{22}R^{23}N^+)E^-$, wherein $R^{20}$, $R^{21}$, $R^{22}$, and $R^{23}$ are independently selected from an aliphatic group having from 1 to about 22 carbon atoms, or an aromatic, alkoxy, polyoxyalkylene, alkylamido, hydroxyalkyl, aryl or alkylaryl group having 1 to about 22 carbon atoms in the alkyl chain; and E is a salt-forming anion such as those selected from halogen, (e.g., chloride, bromide), acetate, citrate, lactate, glycolate, phosphate, nitrate, sulfate, and alkylsulfate. The aliphatic groups can contain, in addition to carbon and hydrogen atoms, ether linkages, ester linkages, and other groups such as amino groups. The longer chain aliphatic groups, e.g., those of about 12 carbons, or higher, can be saturated or unsaturated. In one aspect, the aryl groups are selected from phenyl and benzyl.

Exemplary quaternary ammonium surfactants include, but are not limited to cetyl trimethylammonium chloride, cetylpyridinium chloride, dicetyl dimethyl ammonium chloride, dihexadecyl dimethyl ammonium chloride, stearyl dimethyl benzyl ammonium chloride, dioctadecyl dimethyl ammonium chloride, dieicosyl dimethyl ammonium chloride, didocosyl dimethyl ammonium chloride, dihexadecyl dimethyl ammonium chloride, dihexadecyl dimethyl ammonium acetate, behenyl trimethyl ammonium chloride, benzalkonium chloride, benzethonium chloride, and di(coconutalkyl) dimethyl ammonium chloride, ditallowdimethyl ammonium chloride, di(hydrogenated tallow) dimethyl ammonium chloride, di(hydrogenated tallow) dimethyl ammonium acetate, ditallowdimethyl ammonium methyl sulfate, ditallow dipropyl ammonium phosphate, and ditallow dimethyl ammonium nitrate.

At low pH, amine oxides can protonate and behave similarly to N-alkyl amines. Examples include, but are not limited to, dimethyldodecylamine oxide, oleyldi(2-hydroxyethyl) amine oxide, dimethyltetradecylamine oxide, di(2-hydroxyethyl)-tetradecylamine oxide, dimethylhexadecylamine oxide, behenamine oxide, cocamine oxide, decyltetradecylamine oxide, dihydroxyethyl $C_{12}$-$C_{15}$ alkoxypropylamine oxide, dihydroxyethyl cocamine oxide, dihydroxyethyl lauramine oxide, dihydroxyethyl stearamine oxide, dihydroxyethyl tallowamine oxide, hydrogenated palm kernel amine oxide, hydrogenated tallowamine oxide, hydroxyethyl hydroxypropyl $C_{12}$-$C_{15}$ alkoxypropylamine oxide, lauramine oxide, myristamine oxide, cetylamine oxide, oleamidopropylamine oxide, oleamine oxide, palmitamine oxide, PEG-3 lauramine oxide, dimethyl lauramine oxide, potassium trisphosphonomethylamine oxide, soyamidopropylamine oxide, cocamidopropylamine oxide, stearamine oxide, tallowamine oxide, and mixtures thereof.

The term "amphoteric surfactant" as used herein, is also intended to encompass zwitterionic surfactants, which are well known to formulators skilled in the art as a subset of amphoteric surfactants. Nonlimiting examples of amphoteric surfactants are disclosed McCutcheon's Detergents and Emulsifiers, North American Edition, supra, and McCutcheon's, Functional Materials, North American Edition, supra; both of which are incorporated by reference herein in their entirety. Suitable examples include but are not limited to amino acids (e.g., N-alkyl amino acids and N-acyl amino acids), betaines, sultaines, and alkyl amphocarboxylates.

Amino acid based surfactants suitable in the practice of the present invention include surfactants represented by the formula:

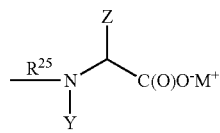

wherein $R^{25}$ represents a saturated or unsaturated hydrocarbon group having 10 to 22 carbon atoms or an acyl group containing a saturated or unsaturated hydrocarbon group having 9 to 22 carbon atoms, Y is hydrogen or methyl, Z is selected from hydrogen, $-CH_3$, $-CH(CH_3)_2$, $-CH_2CH(CH_3)_2$, $-CH(CH_3)CH_2CH_3$, $-CH_2C_6H_5$, $-CH_2C_6H_4OH$, $-CH_2OH$, $-CH(OH)CH_3$, $-(CH_2)_4NH_2$, $-(CH_2)_3NHC(NH)NH_2$, $-CH_2C(O)O\text{-}M^+$, $-(CH_2)_2 C(O)O\text{-}M^+$. M is a salt forming cation. In one aspect, $R^{25}$ represents a radical selected from a linear or branched $C_{10}$ to $C_{22}$ alkyl group, a linear or branched $C_{10}$ to $C_{22}$ alkenyl group, an acyl group represented by $R^{26}C(O)-$, wherein $R^{26}$ is selected from a linear or branched $C_9$ to $C_{22}$ alkyl group, a linear or branched $C_9$ to $C_{22}$ alkenyl group. In one aspect, $M^+$ is a cation selected from sodium, potassium, and ammonium cations, as well as the ammonium salt of mono-, di- and triethanolamine (TEA).

The amino acid surfactants can be derived from the alkylation and acylation of α-amino acids such as, for example, alanine, arginine, aspartic acid, glutamic acid, glycine, isoleucine, leucine, lysine, phenylalanine, serine, tyrosine, and valine. Representative N-acyl amino acid surfactants are, but not limited to the mono- and di-carboxylate salts (e.g., sodium, potassium, ammonium and TEA) of N-acylated glutamic acid, for example, sodium cocoyl glutamate, sodium lauroyl glutamate, sodium myristoyl glutamate, sodium palmitoyl glutamate, sodium stearoyl glutamate, disodium cocoyl glutamate, disodium stearoyl glutamate, potassium cocoyl glutamate, potassium lauroyl glutamate, and potassium myristoyl glutamate; the carboxylate salts (e.g., sodium, potassium, ammonium and TEA) of N-acylated alanine, for example, sodium cocoyl alaninate, and TEA lauroyl alaninate; the carboxylate salts (e.g., sodium, potassium, ammonium and TEA) of N-acylated glycine, for example, sodium cocoyl glycinate, and potassium cocoyl glycinate; the carboxylate salts (e.g., sodium, potassium, ammonium and TEA) of N-acylated sarcosine, for example, sodium lauroyl sarcosinate, sodium cocoyl sarcosinate, sodium myristoyl sarcosinate, sodium oleoyl sarcosinate, and ammonium lauroyl sarcosinate; and mixtures of the foregoing surfactants.

The betaines and sultaines useful in the present invention are selected from alkyl betaines, alkylamino betaines, and alkylamido betaines, as well as the corresponding sulfobetaines (sultaines) represented by the formulas:

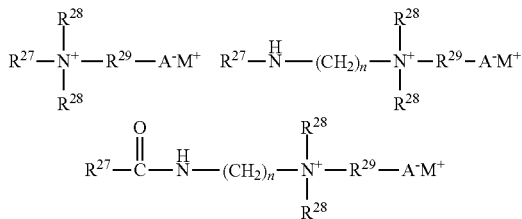

wherein $R^{27}$ is a $C_7$-$C_{22}$ alkyl or alkenyl group, each $R^{28}$ independently is a $C_1$-$C_4$ alkyl group, $R^{29}$ is a $C_1$-$C_5$ alkylene group or a hydroxy substituted $C_1$-$C_5$ alkylene group, n is an integer from 2 to 6, A is a carboxylate or sulfonate group, and M is a salt forming cation. In one aspect, $R^{27}$ is a $C_{11}$-$C_{18}$ alkyl group or a $C_{11}$-$C_{18}$ alkenyl group. In one aspect, $R^{28}$ is methyl. In one aspect, $R^{29}$ is methylene, ethylene or hydroxy propylene. In one aspect, n is 3. In a further aspect, M is selected from sodium, potassium, magnesium, ammonium cations, and the ammonium salt of mono-, di- and triethanolamine. Mixtures of the foregoing betaines and sultaines can be utilized.

Examples of suitable betaines include, but are not limited to, lauryl betaine, myristyl betaine, coco betaine, oleyl betaine, cocohexadecyl dimethylbetaine, lauryl amidopropyl betaine, cocoamidopropyl betaine (CAPB), and cocamidopropyl hydroxysultaine, and mixtures thereof.

The alkylamphocarboxylates such as the alkylamphoacetates and alkylamphopropionates (mono- and disubstituted carboxylates) can be represented by the formula:

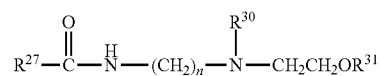

wherein $R^{27}$ is a $C_7$-$C_{22}$ alkyl or alkenyl group, $R^{30}$ is $-CH_2C(O)O\text{-}M^+$, $-CH_2CH_2C(O)O\text{-}M^+$, or $-CH_2CH(OH)CH_2SO_3\text{-}M^+$, $R^{31}$ is hydrogen or $-CH_2C(O)O\text{-}M^+$, and M is a cation selected from sodium, potassium, magnesium, ammonium, and the ammonium salt of mono-, di- and triethanolamine.

Exemplary alkylamphocarboxylates include, but are not limited to, sodium cocoamphoacetate, sodium lauroamphoacetate, sodium capryloamphoacetate, disodium cocoamphodiacetate, disodium lauroamphodiacetate, disodium caprylamphodiacetate, disodium capryloamphodiacetate, disodium cocoamphodipropionate, disodium lauroamphodipropionate, disodium caprylamphodipropionate, and disodium capryloamphodipropionate.

Non-limiting examples of nonionic surfactants are disclosed in McCutcheon's Detergents and Emulsifiers, North American Edition, 1998, supra; and McCutcheon's, Functional Materials, North American, supra; both of which are incorporated by reference herein in their entirety. Additional Examples of nonionic surfactants are described in U.S. Pat. No. 4,285,841, to Barrat et al., and U.S. Pat. No. 4,284,532, to Leikhim et al., both of which are incorporated by reference herein in their entirety. Nonionic surfactants typically have a hydrophobic portion, such as a long chain alkyl group or an alkylated aryl group, and a hydrophilic portion containing various degrees of ethoxylation and/or propoxylation (e.g., 1 to about 50) ethoxy and/or propoxy moieties. Examples of some classes of nonionic surfactants that can be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty acids, condensation products of ethylene oxide with long chain amines or amides, condensation products of ethylene oxide with alcohols, and mixtures thereof.

Suitable nonionic surfactants include, for example, alkyl polysaccharides, alcohol ethoxylates, block copolymers, castor oil ethoxylates, ceto/oleyl alcohol ethoxylates, cetearyl alcohol ethoxylates, decyl alcohol ethoxylates, dinonyl phenol ethoxylates, dodecyl phenol ethoxylates, end-capped ethoxylates, ether amine derivatives, ethoxylated alkanolamides, ethylene glycol esters, fatty acid alkanolamides, fatty alcohol alkoxylates, lauryl alcohol ethoxylates, monobranched alcohol ethoxylates, nonyl phenol ethoxylates, octyl phenol ethoxylates, oleyl amine ethoxylates, random copolymer alkoxylates, sorbitan ester ethoxylates, stearic acid ethoxylates, stearyl amine ethoxylates, tallow oil fatty acid ethoxylates, tallow amine ethoxylates, tridecanol ethoxylates, acetylenic diols, polyoxyethylene sorbitols, and mixtures thereof. Various specific examples of suitable nonionic surfactants include, but are not limited to, methyl gluceth-10, PEG-20 methyl glucose distearate, PEG-20 methyl glucose sesquistearate, ceteth-8, ceteth-12, dodoxynol-12, laureth-15, PEG-20 castor oil, polysorbate 20, steareth-20, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, an ethoxylated nonylphenol, ethoxylated octylphenol, ethoxylated dodecylphenol, or ethoxylated fatty ($C_6$-$C_{22}$) alcohol, including 3 to 20 ethylene oxide moieties, polyoxyethylene-20 isohexadecyl ether, polyoxyethylene-23 glycerol laurate, polyoxyethylene-20 glyceryl stearate, PPG-10 methyl glucose ether, PPG-20 methyl glucose ether, polyoxyethylene-20 sorbitan monoesters, polyoxyethylene-80 castor oil, polyoxyethylene-15 tridecyl ether, polyoxyethylene-6 tridecyl ether, laureth-2, laureth-3, laureth-4, PEG-3 castor oil, PEG 600 dioleate, PEG 400 dioleate, poloxamers such as poloxamer 188, polysorbate 21, polysorbate 40, polysorbate 60, polysorbate 61, polysorbate 65, polysorbate 80, polysorbate 81, polysorbate 85, sorbitan caprylate, sorbitan cocoate, sorbitan diisostearate, sorbitan dioleate, sorbitan distearate, sorbitan fatty acid ester, sorbitan isostearate, sorbitan laurate, sorbitan oleate, sorbitan palmitate, sorbitan sesquiisostearate, sorbitan sesquioleate, sorbitan sesquistearate, sorbitan stearate, sorbitan triisostearate, sorbitan trioleate, sorbitan tristearate, sorbitan undecylenate, or mixtures thereof.

Alkyl glycoside nonionic surfactants can also be employed and are generally prepared by reacting a monosaccharide, or a compound hydrolyzable to a monosaccharide, with an alcohol such as a fatty alcohol in an acid medium. For example, U.S. Pat. Nos. 5,527,892 and 5,770,543 describe alkyl glycosides and/or methods for their preparation. Suitable examples are commercially available under the names of Glucopon™ 220, 225, 425, 600 and 625, PLANTACARE®, and PLANTAPON®, all of which are available from Cognis Corporation of Ambler, Pa.

In another aspect, nonionic surfactants include, but are not limited to, alkoxylated methyl glucosides such as, for example, methyl gluceth-10, methyl gluceth-20, PPG-10 methyl glucose ether, and PPG20 methyl glucose ether, available from Lubrizol Advanced Materials, Inc., under the trade names, Glucam® E10, Glucam® E20, Glucam® P10, and Glucam® P20, respectively; and hydrophobically modified alkoxylated methyl glucosides, such as PEG 120 methyl glucose dioleate, PEG120 methyl glucose trioleate, and PEG-20 methyl glucose sesquistearate, available from Lubrizol Advanced Materials, Inc., under the trade names, Glucamate® DOE-120, Glucamate™ LT, and Glucamate™ SSE-20, respectively, are also suitable. Other exemplary hydrophobically modified alkoxylated methyl glucosides are disclosed in U.S. Pat. Nos. 6,573,375 and 6,727,357, the disclosures of which are hereby incorporated by reference in their entirety.

Other useful nonionic surfactants include water soluble silicones such as PEG-10 Dimethicone, PEG-12 Dimethicone, PEG-14 Dimethicone, PEG-17 Dimethicone, PPG-12 Dimethicone, PPG-17 Dimethicone and derivatized/functionalized forms thereof such as Bis-PEG/PPG20/20 Dimethicone Bis-PEG/PPG-16/16 PEG/PPG-16/16 Dimethicone, PEG/PPG-14/4 Dimethicone, PEG/PPG-20/20 Dimethicone, PEG/PPG20/23 Dimethicone, and Perfluorononylethyl Carboxydecyl PEG-10 Dimethicone.

By dispersants, it is meant polymeric dispersant additives, which are generally hydrocarbon-based polymers that contain the polar portion as part of, or associated with, an acid-bearing, or anhydride, portion of the additive. These dispersants can be described as polyolefinsubstituted carboxylic acid, ester, amide, or imides.

Typical dispersants include N-substituted long chain alkenyl succinimides, having a variety of chemical structures including, typically,

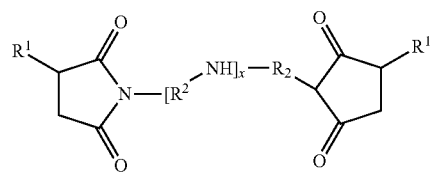

where each $R^1$ is independently an alkyl group, frequently a polyisobutylene group with a molecular weight ($M_n$) of 500-5000 based on the polyisobutylene precursor, and $R^2$ are alkylene groups, commonly ethylene ($C_2H_4$) groups. Such molecules are commonly derived from reaction of an alkenyl acylating agent with a polyamine, and a wide variety of linkages between the two moieties is possible beside the simple imide structure shown above, including a variety of amides and quaternary ammonium salts. In the above structure, the amine portion is shown as an alkylene polyamine, although other aliphatic and aromatic mono- and polyamines may also be used. Also, a variety of modes of linkage of the $R^1$ groups onto the imide structure are possible, including various cyclic linkages. The ratio of the carbonyl groups of the acylating agent to the nitrogen atoms of the amine may be 1:0.5 to 1:3, and in other instances 1:1 to 1:2.75 or 1:1.5 to 1:2.5. Succinimide dispersants are more fully described in U.S. Pat. Nos. 4,234,435 and 3,172,892 and in EP 0355895.

For example such dispersants can be produced by reaction of a C3-C6 polyalkylene (e.g., polypropylene, polyisobutylene, polypentylene, polyheptylene, most often polyisobutylene) or derivative thereof (e.g., a chlorinated derivative) with a mono- or α, β unsaturated-dicarboxylic acid or anhydride thereof (such as maleic anhydride or succinic anhydride) to produce an acylated C3-C6 polyalkylene compound. Acylated polyalkylene compounds may be used without further functionalization, or they may be reacted with an amine, such as a primary amine or a polyamine, such as a polyethylene amine, to produce the dispersant. Examples of acylated polyalkylene compounds include polyisobutenyl succinc anhydride (also called PIBSA).

The polyisobutylene dispersant may be obtained/obtainable from a chlorine-assisted process, a thermal ene reaction (usually involving high vinylidene polymer), or a radical graft process. The method of acylation and process parameters may result in polyisobutylene substituted with between one and two acyl groups, preferably succinic acid or functional equivalents.

Another class of dispersant includes high molecular weight esters. These materials are similar to the above-described succinimides except that they may be seen as having been prepared by reaction of a hydrocarbyl acylating agent and a polyhydric aliphatic alcohol such as glycerol, pentaerythritol, or sorbitol. Such materials are described in more detail in U.S. Pat. No. 3,381,022.

Another class of ashless dispersant is acylated polyalkylene polyamines of the type described in U.S. Pat. No. 5,330,667.

Another class of ashless dispersants is polyesters of hydroxysubstituted long chain fatty acids, such as 12-hydroxy stearic acid, and esters, amides, and amine and ammonium salts thereof. The polyester may be a reaction product of a long chain carboxylic acid containing at least one hydroxyl group and a compound having an oxygen or nitrogen atom capable of condensing with said acid and further having a tertiary amino group. The reaction product may be formed by adding the fatty carboxylic acid and the compound having an oxygen or nitrogen atom capable of condensing with said acid in any order. As used herein the term "long chain carboxylic acid" used in relation to the polyester means an acid with a carbon chain of 8 to 22, or 10 to 22 carbon atoms, also called fatty carboxylic acids.

In some embodiments the hydroxy-carboxylic acid used in the preparation of the polyester may be 12-hydroxystearic acid, ricinoleic acid, 12-hydroxy dodecanoic acid, 5-hydroxy dodecanoic acid, 5-hydroxy decanoic acid, 4-hydroxy decanoic acid, 10-hydroxy undecanoic acid, or combinations thereof.

The polyester dispersant may be further reacted with a nitrogen or oxygen compound containing a tertiary amino group capanle of being quaternized. The compound having an oxygen or nitrogen atom capable of condensing with said acid and further having a tertiary amino group comprises N,N-diethylethylenediamine, N,N-dimethylethylenediamine, N,N-dibutylethylenediamine, N,N-dimethyl-1,3-diaminopropane, N,N-diethyl-1,3-diaminopropane, N,N-dimethylaminoethanol, N,N-diethylamino ethanol, or combinations thereof.

The number average molecular weight (Mn) of the polyester dispersant of the invention may be from 500 to 3000, or from 700 to 2500.

Another class of ashless dispersant is Mannich bases. These are materials formed by the condensation of a higher molecular weight alkyl substituted phenol, an alkylene polyamine, and an aldehyde such as formaldehyde. They are described in more detail in U.S. Pat. No. 3,634,515.

Other dispersants include polymeric dispersant additives, which may be hydrocarbon-based polymers which contain polar functionality to impart dispersancy characteristics to the polymer.

Dispersants can also be post-treated by reaction with any of a variety of agents. Among these are urea, thiourea, dimercaptothiadiazoles, carbon disulfide, aldehydes, ketones, carboxylic acids, hydrocarbon-substituted succinic anhydrides, nitriles, epoxides, boron compounds, and phosphorus compounds. References detailing such treatment are listed in U.S. Pat. No. 4,654,403.

The dispersants can also be quaternized by reaction with a quaternizing agent, such as dialkyl sulfates, benzyl halides, hydrocarbyl substituted carbonates; hydrocarbyl epoxides in combination with an acid, or mixtures thereof.

The level of surfactant in the dispersion will be dependent on several variables, including the type of surfactant, the type of NCAMF, and the type and amount of solid nanoparticles. However, in most embodiments, the surfactant can be included at a level of about 0.1 to about 2 times as much as the concentration of the at least one nanoparticle on a weight basis. In some instances, the surfactant can be included at a level of about 0.08 to about 1.5 times as much as the concentration of the at least one nanoparticle on a weight basis. The surfactant may also be included at a level of about 0.1 to about 1, or about 0.2 to about 0.75 times as much as the concentration of the at least one nanoparticle on a weight basis.

Stable Colloidal Dispersion

The exact formulation of the stable colloidal dispersions depends on the systems into which the dispersions will be employed, and the desired properties needed for that system. For instance, the thermal conductivity, viscosity, flash point, and dielectric properties of the dispersion will be different if the dispersion will be employed to cool a battery pack in an automobile versus cooling of a computer server farm.

The stable colloidal dispersion can be formulated by first choosing at least one non-conductive, non-aqueous and non-water miscible fluid having the desired dielectric properties, flash point and viscosity for the chosen application. At least one solid nanoparticle can be chosen with the desired thermal and conductivity properties for the chosen application and added to the non-conductive, non-aqueous and non-water miscible fluid.

Once the at least one non-conductive, non-aqueous and non-water miscible fluid and at least one solid nanoparticle have been selected, at least one surfactant can be selected for addition to the dispersion. The stable colloidal dispersion can then be prepared according to standard techniques known in the art of dispersion preparation. For example, the stable colloidal dispersion can be prepared by simple mixture of the surfactant and nanoparticles into the non-conductive, non-aqueous and non-water miscible fluid.

However, it has been found to the surprise of the inventors that preparing the dispersion by a two step method results in a more stable dispersion. The two step method involves first dispersing the nanoparticles in an alcohol, such as iso-propyl alcohol with agitation. Suitable alcohols can include, for example, any $C_1$ to $C_{10}$ alcohol or mixtures thereof, but preferably a $C_1$ to $C_5$ alcohol or mixtures thereof, and more preferably a $C_1$ to $C_3$ alcohol or mixtures thereof. A suitable alcohol can be propanol or iso-propanol. Without being bound by theory, it is believed the higher pH of the alcohol provides some electrostatic stabilization to the mixture, resulting in a dispersion of the nanoparticles in the alcohol.

A mixture of the surfactant and the non-conductive, nonaqueous and non-water miscible fluid is prepared. The dispersion of nanoparticles in the alcohol is then combined with the prepared mixture of the surfactant in the non-conductive, non-aqueous and non-water miscible fluid. The combination is agitated, which results in the surfactant extracting the nanoparticles from the alcohol and into the non-conductive, non-aqueous and non-water miscible fluid.

In the two-step method, agitation can be by any known agitation method, such as simple mixing or shaking. It has been found that simple mixing works well for the initial step of dispersing the nanoparticles in the alcohol, and that sonication works well to aid extraction of the nanoparticles from the alcohol into the surfactant.

Dielectric constant (also called relative permittivity) is an important feature of a heat transfer fluid for an immersion cooling system. To avoid issues with electrical current leakage, the stable colloidal dispersion can have a dielectric constant of 10.0 or lower as measured according to ASTM D924. The dielectric constant of the stable colloidal dispersion can also be 7.5 or lower as measured according to ASTM D924. The dielectric constant of the stable colloidal dispersion can also be 5 or lower as measured according to ASTM D924. The dielectric constant of the stable colloidal dispersion can also be 4.0 or lower as measured according to ASTM D924.

The stable colloidal dispersion can also have a kinematic viscosity measured at 100° C. of at least 0.7 cSt, or at least 0.9 cSt, or at least 1.1 cSt, or from 0.7 to 7.0 cSt, or from 0.9 to 6.5 cSt, or even from 1.1 to 6.0 cSt as measured according to ASTM D445_100. For a given chemical family and pump power, higher viscosity fluids are less effective at removing heat, given higher resistance to flow.

Immersion heat transfer fluids need to flow freely at very low temperatures. In one embodiment the stable colloidal dispersion can have a pour point of at least −50° C., or at least −40° C., or at least −30° C. as measured according to ASTM D5985. In one embodiment, the stable colloidal dispersion can have an absolute viscosity of no more than 900 cP at −30° C., or no more than 500 cP at −30° C., or no more than 100 cP at −30° C. as measured according to ASTM D2983.

The stable colloidal dispersion can have a flash point of at least 50° C. as measured according to ASTM D56, or at least 60° C., or at least 75° C., or at least 100° C.

Certain combinations of surfactant and NCAMF have been found to result in particularly stable suspensions. For example, the combination of surfactants with polyamine succinimide head groups used in isoparaffin solvent, or the use of sulfosuccinate head groups in ester solvents, for example, or hydroxystearic acid head groups in ether solvents.

In an embodiment, there is provided a stable colloidal dispersion having a) a liquid hydrocarbon, liquid hydrocarbyl diester or polyester, or mixtures thereof, with a kinematic viscosity at 100° C. of of 0.7 to 7.0 cSt as measured according to ASTM D445_100, b) an aluminum oxide nanoparticle, and c) at least one surfactant having a polar head group including at least one aliphatic amine, polyamine, or combination thereof. The surfactant can have a backbone that includes a polyolefin of Mn 250 to 5000 Daltons. More particularly, the polyolefin backbone of the surfactant can include polymers and co-polymers of ethylene. The polyolefin backbone can also include higher alpha-olefins. The backbone may also include isobutylene, or conjugated dienes of 4 or more carbon atoms. The polyolefin backbone can be a combination of any of the foregoing as well.

Method of Cooling

The disclosed technology provides a method of cooling electrical componentry by immersing the electrical componentry in a bath comprising the stable colloidal dispersion, and operating the electrical component.

Electrical componentry includes any electronics that utilize power and generate thermal energy that must be dissipated to prevent the electronics from overheating. Examples include aircraft electronics, computer electronics such as microprocessors, uninterruptable power supplies (UPSs), power electronics (such as IGBTs, SCRs, thyristers, capacitors, diodes, transistors, rectifiers and the like), and the like. Further examples include invertors, DC to DC convertors, chargers, phase change invertors, electric motors, electric motor controllers, transmissions, KERS (kinetic energy recovery systems), and DC to AC invertors.

While several examples of electrical componentry have been provided, the heat transfer fluid may be employed in any assembly or for any electrical componentry to provide an improved heat transfer fluid with cold temperature performance without significantly increasing the electrical conductivity and potential flammability of the mixture.

The method will be particularly useful in the transfer of heat from a battery systems, such as those in an electric vehicle such as an electric car, truck or even electrified mass transit vehicle, like a train or tram. The main piece of electrical componentry in electrified transportation is often battery modules, which may encompass one or more battery cell stacked relative to one another to construct the battery module. Heat may be generated by each battery cell during charging and discharging operations, or transferred into the battery cells during key-off conditions of the electrified vehicle as a result of relatively extreme (i.e., hot) ambient conditions. The battery module will therefore include a heat transfer system for thermally managing the battery modules over a full range of ambient and/or operating conditions. In fact, operation of battery modules can occur during the use and draining of the power therefrom, such as in the operation of the battery module, or during the charging of the battery module. With regard to charging, the use of the heat transfer fluid can allow the charging of the battery module to at least 75% of the total battery capacity restored in a time period of less than 15 minutes.

Similarly, electrical componentry in electrified transportation can include fuel cells, solar cells, solar panels, photovoltaic cells and the like that require cooling by the heat transfer fluid. Such electrified transportation may also include traditional internal combustion engines as, for example, in a hybrid vehicle.

Electrified transportation may also include electric motors as the electrical componentry. Electric motors may be employed anywhere along the driveline of a vehicle to operate, for example, transmissions, axles and differentials. Such electric motors can be cooled by a heat transfer system employing the heat transfer fluid.

The method can include providing a heat transfer system containing electrical componentry requiring cooling. The heat transfer system will include, among other things, a bath in which the electrical componentry may be situated a manner that allows the electrical componentry to be in direct fluid communication with the stable colloidal dispersion. The bath will be in fluid communication with a heat transfer fluid reservoir containing the stable colloidal dispersion and a heat exchanger.

The electrical componentry may be operated along with operating the heat transfer system. The heat transfer system may be operated, for example, by circulating the stable colloidal dispersion through the heat transfer system.

For example, the heat transfer system may include means to pump cooled stable colloidal dispersion from the heat transfer fluid reservoir into the bath, and to pump heated stable colloidal dispersion out of the bath through the heat exchanger and back into the heat transfer fluid reservoir. In this manner, while the electrically componentry are operated, the heat transfer system may also be operated to provide cooled stable colloidal dispersion to the electrical componentry to absorb heat generated by the electrical componentry, and to remove stable colloidal dispersion that has been heated by the electrical componentry to be sent to the heat exchanger for cooling and recirculation back into the heat transfer fluid reservoir.

A thermal management system as disclosed herein may remove heat at a rate that allows for rapid charging of a battery. The power target for high speed charging includes 120-600 kW. The heat generated during charging or operation of the electrical system is a minimum of 10 kw.

Various embodiments of the compositions disclosed herein may optionally comprise one or more additional performance additives. These additional performance additives may include one or more flame retardants, smoke suppressants, antioxidants, combustion suppressants, metal deactivators, flow additives, corrosion inhibitors, foam inhibitors, demulsifiers, pour point depressants, seal swelling agents, and any combination or mixture thereof. Typically, fully-formulated heat transfer fluids may contain one or more of these performance additives, and often a package of multiple performance additives. In one embodiment, one or more additional additives may be present in the stable colloidal dispersion at 0.01 weight percent up to 3 weight percent, or 0.05 weight percent up to 1.5 weight percent, or 0.1 weight percent up to 1.0 weight percent.

As used herein, the term "hydrocarbyl" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms and encompass substituents as pyridyl, furyl, thienyl and imidazolyl. Heteroatoms include sulfur, oxygen, and nitrogen. In general, no more than two, or no more than one, non-hydrocarbon substituent will be present for every ten carbon atoms in the hydrocarbyl group; alternatively, there may be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

The invention herein is useful for cooling electrical componentry during operation, which may be better understood with reference to the following examples.

EXAMPLES

A series of heat transfer fluids were prepared in non-conductive, non-aqueous and non-water miscible fluids with stable suspensions of solid nanoparticles. The fluids range from simple isoparaffinic hydrocarbons to organic ester and ether compounds. Stable suspensions may be prepared by two general pathways, single step or multi-step. Both processes are described in detail below.

Single Step Process for Preparing Stable Suspension

Surfactant was added to the oleaginous fluid and the resulting solution was sonicated until all surfactant was fully dissolved. After this step, nanopowder was added into the solution, and the nanofluid suspension was ultrasonicated at 900 W for 30 minutes.

Multi-Step Process for Preparing Stable Suspension

Nanoparticles (20 wt %) were dispersed in isopropanol (80 wt %) at pH>8. Surfactant was added to the oleaginous fluid and the resulting oil solution was sonicated until all surfactant was fully dissolved. The nanofluid suspension in isopropanol was added into the oil solution and the nanofluid suspension was ultrasonicated at 900 W for 15 min. After sonication, the nanofluid suspension was left at 70° C. for 8 hours to evaporate all isopropanol. After isopropanol evaporation, the final nanofluid was ultrasonicated at 900 W for 15 minutes.

Milling Process for preparing stable suspensions: A mixture of paraffin/isoparaffin carrier fluid, dispersant, and powder MgO were dispersed using a high shear mixer. The mixture was then dispersed using a horizontal media mill with large 1 mm ceramic media in a recirculation process until the largest particles reached a size of 10-15 microns in diameter. Following milling with 1 mm media, the mixture was dispersed using a horizontal media mill with sub-milimeter ceramic media in a recirculation process until a stable dispersion with particles under <0.5 microns was reached. After milling, the material was partially diluted with an oxygenated hydrocarbon fluid.

Examples of surfactants/dispersants employed in fluid compositions tested are summarized in Table 1.

TABLE 1

| | Surfactants | |
|---|---|---|
| | Chemical Composition | Mn |
| S1 | Poly (12-hydroxystearic acid) with Polyethylene-imine condensate | ~500-2300 & ~1000-20,000 |
| S2 | Poly(12-hydroxy stearic acid) | ~500-2300 |
| S3 | Dioctyl sodium sulfosuccinate | |
| S4 | Succinated polyisobutylene | ~300-1000 |

Utilizing the surfactants above, a series of suspensions were prepared with numerous solid particles. The compositions of the suspensions are summarized below (Table 2).

TABLE 2

| | | | Non-Aqueous Suspensions | | | | |
|---|---|---|---|---|---|---|---|
| | | | | Surfactant | | Solid | |
| | Fluid Composition | Process[1] | ID | Treat (wt %) | Composition | Particle Size (nm) | Treat (wt %) |
| EX1 | Isodecyl Neopentanoate (IN) | | | | | | |
| EX1-G | IN | 2 | S1 | 1.0 | Graphene Oxide | Monolayer[2] | 0.2 |

TABLE 2-continued

Non-Aqueous Suspensions

| | | Surfactant | | | Solid | | |
|---|---|---|---|---|---|---|---|
| | Fluid Composition | Process[1] | ID | Treat (wt %) | Composition | Particle Size (nm) | Treat (wt %) |
| EX1-A1 | IN | 2 | S2 | 0.9 | Alumina | 25 | 10 |
| EX1-A2 | IN | 2 | S2 | 1.8 | Alumina | 25 | 20 |
| EX1-A3 | IN | 1 | S3 | 1.0 | Alumina wire[3] | 5 × 300 | 10 |
| EX2 | Isoparaffin A (IP A) | | | | | | |
| EX2-A | IP A | 1 | S2 | 2.5 | Alumina wire[3] | 5 × 300 | 20 |
| EX2-M | IP A | nd | nd | nd | Magnesium oxide | 20 | 35 |
| EX3 | Diisooctyl adipate (DIA) | | | | | | |
| EX3-T | DIA | 1 | S4 | 2.75 | TiO$_2$ | 25 | 4 |
| EX3-A | DIA | 1 | S4 | 2.75 | Aluminum Nitride | <100 | 4 |
| EX3-Z | DIA | 1 | S4 | 2.75 | Zinc Oxide | <100 | 4 |
| EX4 | Isoparaffin B (IP B) | | | | | | |
| EX4-T | IP B | 1 | S4 | 2.75 | TiO$_2$ | 25 | 4 |
| EX4-A | IP B | 1 | S4 | 2.75 | Aluminum Nitride | <100 | 4 |
| EX4-S | IP B | 1 | S4 | 2.75 | Silicon Nitride | <50 | 4 |
| EX5 | Dihexyl ether (DHE) | | | | | | |
| EX5-M | IP A + DHE + Dodecane[4] | nd | nd | nd | Magnesium oxide | 20 | 19 |
| EX6-M | IP A + DHE + Dodecane[4] | 2 | S2 | 2.5 | Alumina | <50 | 25 |
| EX7-M | IP A + DHE + Dodecane[4] | milling | S2 | 2.5 | Magnesium Oxide | 134 | 25 |

[1]Suspension of solid particles: 1 = single step process; 2 = two-step process
[2]Graphene mono-layer sheets with sheet thickness of less than 2 nm
[3]Alumina wire 300 nm in length and 5 nm in diameter
[4]EX17 diluted with 20 wt % DHE and 20 wt % dodecane Testing Fluids were evaluated for their ability to absorb and disperse heat, measured as thermal conductivity (ASTM D7896 for oil). Thermal performance and viscosity measurements are summarized below (Table 3). Kinematic viscosity at 25° C. is measured according to ASTM D445_25.

TABLE 3

Thermal Testing

| | Kinematic Viscosity at 25° C. | | Thermal Conductivity | | |
|---|---|---|---|---|---|
| Sample | KV (m$^2$/s) | Δ viscosity | Temperature (° C.) | λ (W/(m*K)) | % Increase λ |
| EX1 | 4.30 | | 25.0 | 0.117 | |
| EX1-G | 4.30 | 0 | 22.7 | 0.121 | 3.6 |
| EX1-A1 | 5.39 | 1.09 | 23.8 | 0.129 | 10.8 |
| EX1-A2 | 7.66 | 3.36 | 23.0 | 0.147 | 26.1 |
| EX1-A3 | 5.79 | 1.49 | 23.3 | 0.133 | 13.7 |
| EX2 | 3.60 | | 20.0 | 0.110 | |
| EX2-A | nd | nd | 23.6 | 0.152 | 38.1 |
| EX2-M | 7.17 | 3.57 | 24.3 | 0.181 | 64.6 |
| EX3 | 14.30 | | 20.0 | 0.140 | |
| EX3-T | nd | nd | 23.1 | 0.152 | 8.8 |
| EX3-A | 16.47 | 2.17 | 23.4 | 0.154 | 10.0 |
| EX3-Z | 16.68 | 2.38 | 22.6 | 0.152 | 8.3 |
| EX4 | 5.70 | | 20 | 0.109 | |
| EX4-T | 6.54 | 0.84 | 22.9 | 0.119 | 7.7 |
| EX4-A | 6.79 | 1.09 | 23.3 | 0.118 | 7.2 |
| EX4-S | 7.62 | 1.92 | 22.7 | 0.121 | 9.6 |
| EX5 | 2.00 | | 37.0 | 0.136 | |
| EX5-M | 3.30 | nd | 23.0 | 0.154 | 40.0 |
| EX6-M | 7 | 4.5 | 23 | 0.2 | 31 |
| EX7-M | 6.6 | 4.1 | 23 | 0.2 | 34 |

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

A stable colloidal dispersion comprising, consisting essentially of, or consisting of: (a) a non-conductive, non-aqueous and non-water miscible fluid, (b) at least one solid nanoparticle, wherein the solid comprises, consists essentially of, or consists of at least one of a metal oxide, metal carbide, metal nitride, and mixtures thereof, and (c) a surfactant.

The stable colloidal dispersion of the previous sentence, wherein the non-conductive, non-aqueous and non-water miscible fluid comprises, consists essentially of, or consists of API Group I base oil.

The stable colloidal dispersion of the previous sentence, wherein the non-conductive, non-aqueous and non-water miscible fluid comprises, consists essentially of, or consists of API Group II base oil.

The stable colloidal dispersion of the previous sentence, wherein the non-conductive, non-aqueous and non-water miscible fluid comprises, consists essentially of, or consists of API Group II+base oil.

The stable colloidal dispersion of the previous sentence, wherein the non-conductive, non-aqueous and non-water miscible fluid comprises, consists essentially of, or consists of API Group III base oil.

The stable colloidal dispersion of the previous sentence, wherein the non-conductive, non-aqueous and non-water miscible fluid comprises, consists essentially of, or consists of API Group III+base oil.

The stable colloidal dispersion of the previous sentence, wherein the non-conductive, non-aqueous and non-water miscible fluid comprises, consists essentially of, or consists of API Group IV base oil.

The stable colloidal dispersion of the previous sentence, wherein the non-conductive, non-aqueous and non-water miscible fluid comprises, consists essentially of, or consists of API Group V base oil.

The stable colloidal dispersion of the previous sentence, wherein the non-conductive, non-aqueous and non-water miscible fluid comprises, consists essentially of, or consists of isoparaffins.

The stable colloidal dispersion of the previous sentence, wherein the non-conductive, non-aqueous and non-water miscible fluid comprises, consists essentially of, or consists of polyolefins.

The stable colloidal dispersion of the previous sentence, wherein the non-conductive, non-aqueous and non-water miscible fluid comprises, consists essentially of, or consists of poly-α-olefins.

The stable colloidal dispersion of the previous sentence, wherein the non-conductive, non-aqueous and non-water miscible fluid comprises, consists essentially of, or consists of mineral oils.

The stable colloidal dispersion of the previous sentence, wherein the non-conductive, non-aqueous and non-water miscible fluid comprises, consists essentially of, or consists of ester oils.

The stable colloidal dispersion of any previous sentence, comprising, consisting essentially of, or consisting of, from 0.5 to 40 wt % of the at least one solid nanoparticle of (b).

The stable colloidal dispersion of any previous sentence, comprising, consisting essentially of, or consisting of, from 0.75 to 35 wt % of the at least one solid nanoparticle of (b).

The stable colloidal dispersion of any previous sentence, comprising, consisting essentially of, or consisting of, from 1 to 30 wt % of the at least one solid nanoparticle of (b).

The stable colloidal dispersion of any previous sentence, comprising, consisting essentially of, or consisting of, from 1.25 to 25 wt % of the at least one solid nanoparticle of (b).

The stable colloidal dispersion of any previous sentence, comprising, consisting essentially of, or consisting of, from 0.5 to 10 wt % of the at least one solid nanoparticle of (b).

The stable colloidal dispersion of any previous sentence, comprising, consisting essentially of, or consisting of, from 0.75 to 8 wt % of the at least one solid nanoparticle of (b).

The stable colloidal dispersion of any previous sentence, comprising, consisting essentially of, or consisting of, from 0.1 to 6 wt % of the at least one solid nanoparticle of (b).

The stable colloidal dispersion of any previous sentence, comprising, consisting essentially of, or consisting of, from 10 to 40 wt % of the at least one solid nanoparticle of (b).

The stable colloidal dispersion of any previous sentence, comprising, consisting essentially of, or consisting of, from 15 to 35 wt % of the at least one solid nanoparticle of (b).

The stable colloidal dispersion of any previous sentence, comprising, consisting essentially of, or consisting of, from 20 to 30 wt % of the at least one solid nanoparticle of (b).

The stable colloidal dispersion of any previous sentence, wherein the at least one solid nanoparticle of (b) has a D50 particle size of 1000 nm or less as measured according to according to ASTM E2490-09(2015).

The stable colloidal dispersion of any previous sentence, wherein the at least one solid nanoparticle of (b) has a D50 particle size of 700 nm or less as measured according to according to ASTM E2490-09(2015).

The stable colloidal dispersion of any previous sentence, wherein the at least one solid nanoparticle of (b) has a D50 particle size of 500 nm or less as measured according to according to ASTM E2490-09(2015).

The stable colloidal dispersion of any previous sentence, wherein the at least one solid nanoparticle of (b) has a D50 particle size of 250 nm or less as measured according to according to ASTM E2490-09(2015).

The stable colloidal dispersion of any previous sentence, wherein the at least one solid nanoparticle of (b) has a D50 particle size of 100 nm or less as measured according to according to ASTM E2490-09(2015).

The stable colloidal dispersion of any previous sentence, wherein the at least one solid nanoparticle of (b) has a D50 particle size of 75 nm or less as measured according to according to ASTM E2490-09(2015).

The stable colloidal dispersion of any previous sentence, wherein the at least one solid nanoparticle of (b) has a D50 particle size of 50 nm or less as measured according to according to ASTM E2490-09(2015).

The stable colloidal dispersion of any previous sentence, wherein the at least one solid nanoparticle of (b) has a D50 particle size of 0.01 nm to 1000 nm as measured according to according to ASTM E2490-09(2015).

The stable colloidal dispersion of any previous sentence, wherein the at least one solid nanoparticle of (b) has a D50 particle size of 0.1 nm to 100 nm as measured according to according to ASTM E2490-09(2015).

The stable colloidal dispersion of any previous sentence, wherein the at least one solid nanoparticle of (b) has a D50 particle size of 1 nm to 75 nm as measured according to according to ASTM E2490-09(2015).

The stable colloidal dispersion of any previous sentence, wherein the at least one solid nanoparticle of (b) has a D50 particle size of 10 nm to 50 nm as measured according to according to ASTM E2490-09(2015).

The stable colloidal dispersion of any previous sentence, wherein the at least one solid nanoparticle of (b) comprises, consists essentially of, or consists of a metal nanoparticle.

The stable colloidal dispersion of any previous sentence, wherein the at least one solid nanoparticle of (b) comprises, consists essentially of, or consists of an alkaline earth metal nanoparticle.

The stable colloidal dispersion of any previous sentence, wherein the at least one solid nanoparticle of (b) comprises, consists essentially of, or consists of a transition metal nanoparticle.

The stable colloidal dispersion of any previous sentence, wherein the at least one solid nanoparticle of (b) comprises, consists essentially of, or consists of an actinide series metal nanoparticle.

The stable colloidal dispersion of any previous sentence, wherein the at least one solid nanoparticle of (b) comprises, consists essentially of, or consists of a lanthanide series metal nanoparticle.

The stable colloidal dispersion of any previous sentence, wherein the at least one solid nanoparticle of (b) comprises, consists essentially of, or consists of a post-transition metal nanoparticle.

The stable colloidal dispersion of any previous sentence, wherein the at least one solid nanoparticle of (b) comprises, consists essentially of, or consists of a metalloid nanoparticle.

The stable colloidal dispersion of any previous sentence, wherein the at least one solid nanoparticle of (b) comprises, consists essentially of, or consists of a solid oxide nanoparticle.

The stable colloidal dispersion of any previous sentence, wherein the at least one solid nanoparticle of (b) comprises, consists essentially of, or consists of aluminum oxide.

The stable colloidal dispersion of any previous sentence, wherein the at least one solid nanoparticle of (b) comprises, consists essentially of, or consists of magnesium oxide.

The stable colloidal dispersion of any previous sentence, wherein the at least one solid nanoparticle of (b) comprises, consists essentially of, or consists of graphene oxide.

The stable colloidal dispersion of any previous sentence, wherein the at least one solid nanoparticle of (b) comprises, consists essentially of, or consists of zinc oxide.

The stable colloidal dispersion of any previous sentence, wherein the at least one solid nanoparticle of (b) comprises, consists essentially of, or consists of titanium dioxide.

The stable colloidal dispersion of any previous sentence, wherein the at least one solid nanoparticle of (b) comprises, consists essentially of, or consists of a solid carbide nanoparticle.

The stable colloidal dispersion of any previous sentence, wherein the at least one solid nanoparticle of (b) comprises, consists essentially of, or consists of a solid nitride nanoparticle.

The stable colloidal dispersion of any previous sentence, wherein the at least one solid nanoparticle of (b) comprises, consists essentially of, or consists of aluminum nitride.

The stable colloidal dispersion of any previous sentence, wherein the at least one solid nanoparticle of (b) comprises, consists essentially of, or consists of silicon nitride.

The stable colloidal dispersion of any previous sentence, wherein the at least one solid nanoparticle of (b) has an average aspect ratio of from 1 to 5000.

The stable colloidal dispersion of any previous sentence, wherein the at least one solid nanoparticle of (b) has an average aspect ratio of from 1 to 2500.

The stable colloidal dispersion of any previous sentence, wherein the at least one solid nanoparticle of (b) has an average aspect ratio of from 1 to 1000.

The stable colloidal dispersion of any previous sentence, wherein the at least one solid nanoparticle of (b) has an average aspect ratio of from 1 to 500.

The stable colloidal dispersion of any previous sentence, wherein the at least one solid nanoparticle of (b) has an average aspect ratio of from 1 to 250.

The stable colloidal dispersion of any previous sentence, wherein the at least one solid nanoparticle of (b) has an average aspect ratio of from 1 to 100.

The stable colloidal dispersion of any previous sentence, wherein the at least one solid nanoparticle of (b) has an average aspect ratio of from 1 to 50.

The stable colloidal dispersion of any previous sentence, wherein the at least one solid nanoparticle of (b) has an average aspect ratio of from 1 to 25.

The stable colloidal dispersion of any previous sentence, wherein the at least one solid nanoparticle of (b) has an average aspect ratio of from 1 to 10.

The stable colloidal dispersion of any previous sentence, wherein the at least one solid nanoparticle of (b) has an average aspect ratio of from 10 to 5000.

The stable colloidal dispersion of any previous sentence, wherein the at least one solid nanoparticle of (b) has an average aspect ratio of from 25 to 5000.

The stable colloidal dispersion of any previous sentence, wherein the at least one solid nanoparticle of (b) has an average aspect ratio of from 50 to 5000.

The stable colloidal dispersion of any previous sentence, wherein the at least one solid nanoparticle of (b) has an average aspect ratio of from 100 to 5000.

The stable colloidal dispersion of any previous sentence, wherein the at least one solid nanoparticle of (b) has an average aspect ratio of from 250 to 5000.

The stable colloidal dispersion of any previous sentence, wherein the at least one solid nanoparticle of (b) has an average aspect ratio of from 500 to 5000.

The stable colloidal dispersion of any previous sentence, wherein the at least one solid nanoparticle of (b) has an average aspect ratio of from 1000 to 5000.

The stable colloidal dispersion of any previous sentence, wherein the at least one solid nanoparticle of (b) has an average aspect ratio of from 2500 to 5000.

The stable colloidal dispersion of any previous sentence, wherein the at least one solid nanoparticle of (b) comprises, consists essentially of, or consists of alumina wire having an average aspect ratio of between 1 and 5000.

The stable colloidal dispersion of any previous sentence, comprising, consisting essentially of, or consisting of 0.1 to 2 times as much surfactant as the at least one nanoparticle.

The stable colloidal dispersion of any previous sentence, comprising, consisting essentially of, or consisting of 0.08 to 1.5 times as much surfactant as the at least one nanoparticle.

The stable colloidal dispersion of any previous sentence, comprising, consisting essentially of, or consisting of 0.1 to 1 times as much surfactant as the at least one nanoparticle.

The stable colloidal dispersion of any previous sentence, comprising, consisting essentially of, or consisting of 0.2 to 0.75 times as much surfactant as the at least one nanoparticle.

The stable colloidal dispersion of any previous sentence, wherein the surfactant comprises, consists essentially of, consists of anionic surfactants.

The stable colloidal dispersion of any previous sentence, wherein the surfactant comprises, consists essentially of, consists of alkyl sulfates.

The stable colloidal dispersion of any previous sentence, wherein the surfactant comprises, consists essentially of, consists of alkyl ether sulfates.

The stable colloidal dispersion of any previous sentence, wherein the surfactant comprises, consists essentially of, consists of salicylates.

The stable colloidal dispersion of any previous sentence, wherein the surfactant comprises, consists essentially of, consists of alkyl sulphonates.

The stable colloidal dispersion of any previous sentence, wherein the surfactant comprises, consists essentially of, consists of alkaryl sulfonates.

The stable colloidal dispersion of any previous sentence, wherein the surfactant comprises, consists essentially of, consists of α-olefin-sulphonates.

The stable colloidal dispersion of any previous sentence, wherein the surfactant comprises, consists essentially of, consists of alkylamide sulphonates.

The stable colloidal dispersion of any previous sentence, wherein the surfactant comprises, consists essentially of, consists of alkarylpolyether sulphates.

The stable colloidal dispersion of any previous sentence, wherein the surfactant comprises, consists essentially of, consists of alkylamidoether sulphates.

The stable colloidal dispersion of any previous sentence, wherein the surfactant comprises, consists essentially of, consists of alkyl monoglyceryl ether sulfates.

The stable colloidal dispersion of any previous sentence, wherein the surfactant comprises, consists essentially of, consists of alkyl monoglyceride sulfates.

The stable colloidal dispersion of any previous sentence, wherein the surfactant comprises, consists essentially of, consists of alkyl monoglyceride sulfonates.

The stable colloidal dispersion of any previous sentence, wherein the surfactant comprises, consists essentially of, consists of alkyl succinates.

The stable colloidal dispersion of any previous sentence, wherein the surfactant comprises, consists essentially of, consists of alkyl sulfosuccinates.

The stable colloidal dispersion of any previous sentence, wherein the surfactant comprises, consists essentially of, consists of alkyl sulfosuccinamates.

The stable colloidal dispersion of any previous sentence, wherein the surfactant comprises, consists essentially of, consists of alkyl ether sulphosuccinates.

The stable colloidal dispersion of any previous sentence, wherein the surfactant comprises, consists essentially of, consists of alkyl amidosulfosuccinates.

The stable colloidal dispersion of any previous sentence, wherein the surfactant comprises, consists essentially of, consists of alkyl sulphoacetates.

The stable colloidal dispersion of any previous sentence, wherein the surfactant comprises, consists essentially of, consists of alkyl phosphates.

The stable colloidal dispersion of any previous sentence, wherein the surfactant comprises, consists essentially of, consists of alkyl ether phosphates.

The stable colloidal dispersion of any previous sentence, wherein the surfactant comprises, consists essentially of, consists of alkyl ether carboxylates.

The stable colloidal dispersion of any previous sentence, wherein the surfactant comprises, consists essentially of, consists of alkyl amidoethercarboxylates.

The stable colloidal dispersion of any previous sentence, wherein the surfactant comprises, consists essentially of, consists of N-alkylamino acids.

The stable colloidal dispersion of any previous sentence, wherein the surfactant comprises, consists essentially of, consists of N-acyl amino acids.

The stable colloidal dispersion of any previous sentence, wherein the surfactant comprises, consists essentially of, consists of alkyl peptides.

The stable colloidal dispersion of any previous sentence, wherein the surfactant comprises, consists essentially of, consists of N-acyl taurates.

The stable colloidal dispersion of any previous sentence, wherein the surfactant comprises, consists essentially of, consists of alkyl isethionates.

The stable colloidal dispersion of any previous sentence, wherein the surfactant comprises, consists essentially of, consists of carboxylate salts.

The stable colloidal dispersion of any previous sentence, wherein the surfactant comprises, consists essentially of, consists of cationic surfactants.

The stable colloidal dispersion of any previous sentence, wherein the surfactant comprises, consists essentially of, consists of alkyl amines.

The stable colloidal dispersion of any previous sentence, wherein the surfactant comprises, consists essentially of, consists of alkyl imidazolines.

The stable colloidal dispersion of any previous sentence, wherein the surfactant comprises, consists essentially of, consists of ethoxylated amines.

The stable colloidal dispersion of any previous sentence, wherein the surfactant comprises, consists essentially of, consists of quaternary compounds.

The stable colloidal dispersion of any previous sentence, wherein the surfactant comprises, consists essentially of, consists of quaternized esters.

The stable colloidal dispersion of any previous sentence, wherein the surfactant comprises, consists essentially of, consists of alkyl amine oxides.

The stable colloidal dispersion of any previous sentence, wherein the surfactant comprises, consists essentially of, consists of nonionic surfactants.

The stable colloidal dispersion of any previous sentence, wherein the surfactant comprises, consists essentially of, consists of ethoxylated alkylphenols.

The stable colloidal dispersion of any previous sentence, wherein the surfactant comprises, consists essentially of, consists of ethoxylated fatty alcohols.

The stable colloidal dispersion of any previous sentence, wherein the surfactant comprises, consists essentially of, consists of propoxylated fatty alcohols.

The stable colloidal dispersion of any previous sentence, wherein the surfactant comprises, consists essentially of, consists of polyethylene glycol ethers of methyl glucose.

The stable colloidal dispersion of any previous sentence, wherein the surfactant comprises, consists essentially of, consists of polyethylene glycol ethers of sorbitol.

The stable colloidal dispersion of any previous sentence, wherein the surfactant comprises, consists essentially of, consists of ethylene oxide-propylene oxide block copolymers.

The stable colloidal dispersion of any previous sentence, wherein the surfactant comprises, consists essentially of, consists of ethoxylated esters of fatty acids.

The stable colloidal dispersion of any previous sentence, wherein the surfactant comprises, consists essentially of, consists of condensation products of ethylene oxide with long chain amines or amides.

The stable colloidal dispersion of any previous sentence, wherein the surfactant comprises, consists essentially of, consists of condensation products of ethylene oxide with alcohols.

The stable colloidal dispersion of any previous sentence, wherein the surfactant comprises, consists essentially of, consists of amphoteric surfactants.

The stable colloidal dispersion of any previous sentence, wherein the surfactant comprises, consists essentially of, consists of amino acids.

The stable colloidal dispersion of any previous sentence, wherein the surfactant comprises, consists essentially of, consists of betaines.

The stable colloidal dispersion of any previous sentence, wherein the surfactant comprises, consists essentially of, consists of sultaines.

The stable colloidal dispersion of any previous sentence, wherein the surfactant comprises, consists essentially of, consists of alkyl amphocarboxylates.

The stable colloidal dispersion of any previous sentence, wherein the surfactant comprises, consists essentially of, consists of polymeric dispersants.

The stable colloidal dispersion of any previous sentence, wherein the surfactant comprises, consists essentially of, consists of polyolefin-substituted carboxylic acid.

The stable colloidal dispersion of any previous sentence, wherein the surfactant comprises, consists essentially of, consists of polyolefin-substituted carboxylic ester.

The stable colloidal dispersion of any previous sentence, wherein the surfactant comprises, consists essentially of, consists of polyolefin-substituted carboxylic amide.

The stable colloidal dispersion of any previous sentence, wherein the surfactant comprises, consists essentially of, consists of polyolefin-substituted carboxylic imide.

The stable colloidal dispersion of any previous sentence, wherein the surfactant comprises, consists essentially of, consists of Nsubstituted long chain alkenyl succinimides.

The stable colloidal dispersion of any previous sentence, wherein the surfactant comprises, consists essentially of, consists of high molecular weight esters prepared by reaction of a hydrocarbyl acylating agent and a polyhydric aliphatic alcohol.

The stable colloidal dispersion of any previous sentence, wherein the surfactant comprises, consists essentially of, consists of acylated polyalkylene polyamines.

The stable colloidal dispersion of any previous sentence, wherein the surfactant comprises, consists essentially of, consists of polyesters of hydroxy-substituted long chain fatty acids.

The stable colloidal dispersion of any previous sentence, wherein the surfactant comprises, consists essentially of, consists of polyesters of hydroxy-substituted long chain fatty esters.

The stable colloidal dispersion of any previous sentence, wherein the surfactant comprises, consists essentially of, consists of polyesters of hydroxy-substituted long chain fatty amides.

The stable colloidal dispersion of any previous sentence, wherein the surfactant comprises, consists essentially of, consists of polyesters of hydroxy-substituted long chain fatty amine.

The stable colloidal dispersion of any previous sentence, wherein the surfactant comprises, consists essentially of, consists of polyesters of hydroxy-substituted long chain fatty acid ammonium salts.

The stable colloidal dispersion of any previous sentence, wherein the surfactant comprises, consists essentially of, consists of Mannich bases.

The stable colloidal dispersion of any previous sentence, wherein the surfactant is quaternized by reaction with a quaternizing agent, consisting of dialkyl sulfates, benzyl halides, hydrocarbyl substituted carbonates; hydrocarbyl epoxides in combination with an acid, and mixtures thereof.

The stable colloidal dispersion of any previous sentence, wherein the surfactant contains an aliphatic amine polar head group.

The stable colloidal dispersion of any previous sentence, wherein the surfactant contains a polyamine polar head group.

The stable colloidal dispersion of any previous sentence, wherein the surfactant comprises, consists essentially of, consists of a polyisobutylene succinic acid or anhydride.

The stable colloidal dispersion of any previous sentence, wherein the non-conductive, non-aqueous and non-water miscible fluid comprises, consists essentially of, or consists of a liquid hydrocarbon, liquid hydrocarbyl diester or polyester, or mixtures thereof, with a kinematic viscosity at 100° C. of 0.7 to 7.0 cSt as measured according to ASTM D445_100.

The stable colloidal dispersion of any previous sentence, wherein the surfactant contains a polyolefin of Mn 250 to 5000 Daltons.

The dispersion of any previous sentence, wherein the polyolefin comprises, consists essentially of, or consists of polymers and co-polymers of ethylene, higher alpha-olefins, isobutylene, conjugated dienes of 4 or more carbon atoms, or any combination thereof.

The dispersion of any previous sentence, wherein the dispersion is prepared in a two-step process comprising, consisting essentially of, or consisting of the steps of 1) dispersing the solid nanoparticles in an alcohol with agitation, 2) mixing the surfactant with the non-conductive, non-aqueous and non-water miscible fluid, and 3) combining the dispersion of 1) with the mixture of 2) with agitation.

A heat transfer system comprising, consisting essentially of, or consisting of (a) a stable colloidal dispersion as claimed in any previous sentence, and (b) a circulation system for circulating the stable colloidal dispersion in close contact to electrical componentry.

A method of dispersing heat from electrical componentry comprising, consisting essentially of, or consisting of, (a) providing a heat transfer system in close contact with the electrical componentry, (b) circulating through said heat transfer system a stable colloidal dispersion as claimed in any previous sentence, and (c) operating the electrical componentry and the heat transfer system.

A method of preparing a dispersion of solid nanoparticles in a non-conductive, non-aqueous and non-water miscible fluid comprising, consisting essentially of, or consisting of the steps of 1) dispersing the solid nanoparticles in an alcohol with agitation, 2) mixing the surfactant with the non-conductive, non-aqueous and non-water miscible fluid, and 3) combining the dispersion of 1) with the mixture of 2) with agitation.

The method of the previous paragraph wherein the alcohol comprises, consists essentially of, consists of a $C_1$ to $C_{10}$ alcohol or mixtures thereof. The method of the previous paragraph wherein the alcohol comprises, consists essentially of, consists of a $C_1$ to $C_5$ alcohol or mixtures thereof. The method of the previous paragraph wherein the alcohol comprises, consists essentially of, consists of a $C_1$ to $C_3$ alcohol or mixtures thereof. The method of the previous paragraph wherein the alcohol comprises, consists essentially of, consists of propanol. The method of the previous paragraph wherein the alcohol comprises, consists essentially of, consists of iso-propanol.

The method of any previous paragraph, wherein agitation in step 1) comprises, consists essentially of, or consists of mixing. The method of any previous paragraph, wherein agitation in step 1) comprises, consists essentially of, or consists of shaking. The method of any previous paragraph, wherein agitation in step 1) comprises, consists essentially of, or consists of sonication.

The method of any previous paragraph, wherein agitation in step 3) comprises, consists essentially of, or consists of mixing. The method of any previous paragraph, wherein agitation in step 3) comprises, consists essentially of, or consists of shaking. The method of any previous paragraph, wherein agitation in step 3) comprises, consists essentially of, or consists of sonication.

What is claimed is:

1. A stable colloidal dispersion comprising:
   (a) a non-conductive, non-aqueous and non-water miscible fluid selected from isoparaffinic oils,
   (b) 0.5 to 40 wt % of at least one solid nanoparticle, wherein the solid comprises magnesium oxide, and
   (c) a surfactant.

2. The stable colloidal dispersion of claim 1, wherein the at least one solid nanoparticle of (b) has a D50 particle size of 1000 nm or less.

3. The stable colloidal dispersion of claim 1, comprising 0.1 to 2 times as much surfactant as the at least one nanoparticle.

4. The stable colloidal dispersion of claim 1, wherein the surfactant contains an aliphatic amine polar head group, a polyamine polar head group, or combinations thereof.

5. The stable colloidal dispersion of claim 1, wherein the surfactant backbone comprises a polyolefin of Mn 250 to 5000 Daltons.

6. The stable colloidal dispersion of claim 1, wherein the dispersion is prepared in a two-step process comprising, consisting essentially of, or consisting of the steps of 1) dispersing the solid nanoparticles in an alcohol with agitation, 2) mixing the surfactant with the non-conductive, non-aqueous and non-water miscible fluid, and 3) combining the dispersion of 1) with the mixture of 2) with agitation.

7. A heat transfer system comprising
   (a) a stable colloidal dispersion as claimed in claim 1, and
   (b) a circulation system for circulating the stable colloidal dispersion in close contact to electrical componentry.

8. A method of dispersing heat from DC to AC invertor comprising,
   (a) providing a heat transfer system in close contact with the DC to AC invertor,
   (b) circulating through said heat transfer system a stable colloidal dispersion as claimed in claim 1, and
   (c) operating the DC to AC invertor and the heat transfer system.

* * * * *